(12) United States Patent
Gerlach

(10) Patent No.: US 8,831,120 B2
(45) Date of Patent: Sep. 9, 2014

(54) ADAPTIVE SUBCARRIER ALLOCATION TO A MOBILE TERMINAL IN A MULTI CELL FDM OR OFDM NETWORK

(75) Inventor: Christian Georg Gerlach, Ditzingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 3 days.

(21) Appl. No.: 13/239,979

(22) Filed: Sep. 22, 2011

(65) Prior Publication Data

US 2012/0008582 A1     Jan. 12, 2012

Related U.S. Application Data

(63) Continuation of application No. 11/640,285, filed on Dec. 18, 2006, now Pat. No. 8,054,895.

(30) Foreign Application Priority Data

Jan. 13, 2006   (EP) ..................................... 06290093

(51) Int. Cl.
| | | |
|---|---|---|
| *H04K 1/10* | (2006.01) | |
| *H04L 5/00* | (2006.01) | |
| *H04L 1/00* | (2006.01) | |
| *H04W 72/08* | (2009.01) | |
| *H04B 7/02* | (2006.01) | |
| *H04B 17/00* | (2006.01) | |
| *H04W 88/08* | (2009.01) | |
| *H04W 16/14* | (2009.01) | |
| *H04W 24/00* | (2009.01) | |
| *H04W 52/40* | (2009.01) | |
| *H04W 52/50* | (2009.01) | |
| *H04W 52/24* | (2009.01) | |

(52) U.S. Cl.
CPC ............. *H04W 52/24* (2013.01); *H04L 5/0032* (2013.01); *H04L 1/0015* (2013.01); *H04W 88/08* (2013.01); *H04W 16/14* (2013.01); *H04W 72/082* (2013.01); *H04W 24/00* (2013.01); *H04W 52/40* (2013.01); *H04W 52/50* (2013.01); *H04L 5/0046* (2013.01); *H04W 52/243* (2013.01); *H04L 5/006* (2013.01); *H04B 7/022* (2013.01); *H04L 5/0007* (2013.01); *H04W 52/247* (2013.01); *H04B 17/0077* (2013.01)
USPC ......................................................... 375/260

(58) Field of Classification Search
CPC ........... H04L 27/2647; H04W 52/242; H04W 52/0216; H04W 52/0219; H04W 52/243
USPC .......... 375/260, 259, 147, 148, 264; 370/329; 455/69, 63.1
See application file for complete search history.

(56) References Cited

U.S. PATENT DOCUMENTS

| | | | | |
|---|---|---|---|---|
| 5,295,138 | A * | 3/1994 | Greenberg et al. ............ | 370/344 |
| 5,491,837 | A * | 2/1996 | Haartsen .......................... | 455/62 |
| 5,726,978 | A | 3/1998 | Frodigh et al. | |
| 6,061,568 | A * | 5/2000 | Dent ............................... | 455/450 |
| 7,072,315 | B1 | 7/2006 | Liu et al. | |
| 7,103,364 | B2 * | 9/2006 | Ishikawa et al. ............... | 455/453 |
| 7,460,876 | B2 * | 12/2008 | Sadri et al. ..................... | 455/522 |
| 2002/0147017 | A1 | 10/2002 | Li et al. | |
| 2004/0127245 | A1 | 7/2004 | Sadri et al. | |
| 2005/0031047 | A1 | 2/2005 | Maltsev et al. | |
| 2005/0053170 | A1 * | 3/2005 | Catreux et al. ................ | 375/267 |
| 2005/0075122 | A1 * | 4/2005 | Lindoff et al. ................ | 455/522 |
| 2005/0152465 | A1 | 7/2005 | Maltsev et al. | |
| 2005/0250564 | A1 * | 11/2005 | Kishigami et al. .......... | 455/575.7 |
| 2006/0094363 | A1 * | 5/2006 | Kang et al. .................... | 455/63.1 |
| 2008/0107195 | A1 * | 5/2008 | Kishigami et al. ............. | 375/260 |

FOREIGN PATENT DOCUMENTS

| | | |
|---|---|---|
| CN | 100382539 C | 4/2008 |
| EP | 1526674 A1 | 4/2005 |

OTHER PUBLICATIONS

3GPP TSG RAN WG1 #42 R1-05-0694 London, UK Aug. 29-Sep. 2, 2005 Title: Multi-cell Simulation Results for Interference Co-ordination in new OFDM DL_ Source: Alcatel, pp. 1-11.*

European App. No. 06290093.1, European Search Report, Jun. 22, 2006, 3 pages.
Wong et al., Multiuser OFDM with Adaptive Subcarrier, Bit, and Power Allocation, IEEE Journal on Selected Areas in Communications, vol. 17, No. 10, Oct. 1998, pp. 1747-1758.
Svedman, "Multiuser Diversity Orthogonal Frequency Division Multiple Access Systems", Licentiate Thesis, Signal Processing Laboratory, KTH Signals, Sensors, and Systems, Royal Institute of Technology, Stockholm, Sweden, 2004; 100 pages.
English Bibliography for Chinese Pat. App. Publication No. CN1610333 (now Chinese Patent No. 100382539), filed Oct. 19, 2004, printed from Thomson Innovation on Nov. 7, 2012, 4 pages.

\* cited by examiner

*Primary Examiner* — Shuwang Liu
*Assistant Examiner* — Helene Tayong
(74) *Attorney, Agent, or Firm* — Fay Sharpe LLP

(57) ABSTRACT

The invention concerns a method for performing adaptive subcarrier allocation to a mobile terminal (T1-T4) for OFDM or FDM transmission in a multi cell network (CN), whereby transmit powers of base stations (BS1-BS8) are estimated, channel transfer functions are calculated based on measurements in the mobile terminal (T1-T4) of pilots transmitted from base stations (BS1-BS8), the transmit powers are weighted with the channel transfer functions, a signal power and an interference power received in the mobile terminal (T1-T4) are estimated based on said weighted transmit powers, a signal to interference ratio is estimated based on the estimated signal and interference power received in the mobile terminal (T1-T4), and the adaptive subcarrier allocation is based on the signal to interference ratio of the subcarriers experienced by the mobile terminal (T1-T4), a base station (BS1-BS8), a mobile terminal (T1-T4) and a multi cell network (CN) therefor.

13 Claims, 2 Drawing Sheets

ADAPTIVE SUBCARRIER ALLOCATION TO A MOBILE TERMINAL IN A MULTI CELL FDM OR OFDM NETWORK

CROSS-REFERENCE TO RELATED APPLICATIONS

This application is a continuation application of co-pending U.S. patent application Ser. No. 11/640,285, filed Dec. 18, 2006, which claims the benefit of European Patent Application No. 06290093.1, filed Jan. 13, 2006. The disclosures of both of these documents are fully incorporated herein by reference.

BACKGROUND

Orthogonal Frequency Division Multiplexing (OFDM) radio systems are currently under discussion in many places as e.g. in 3GPP Technical Specification Group (TSG) Radio Access Network (RAN1). Such a radio system should be a so-called frequency reuse of 1 network, i.e. a network in which all base stations use the same subcarrier frequencies, as W-CDMA (W-CDMA=Wideband Code Division Multiple Access) currently is.

Given the licensed bandwidth, transmission capacity from network providers e.g. for WEB surfing or video streaming or video communication has to be as high as possible for all users to serve as many subscribers as possible. Further the quality of service experienced by the user and especially the coverage of the service is an important property demanded by the user. So Orthogonal Frequency Division Multiplexing shall work well at the cell borders of a frequency reuse of 1 network and exploit the channel capacity.

OFDM is a multi-carrier modulation technique. The data is divided among a large number of closely spaced subcarriers. Several bits of a bit stream are mapped on one subcarrier by modulating the complex amplitude c by e.g. QPSK (QPSK=Quadrature Phase Shift Keying), 16-QAM or 64-QAM (QAM=Quadrature Amplitude Modulation). If the subcarriers that are spaced in frequency at intervals of 1/Tsym are emitted for a symbol duration Tsym, the resulting signals are all orthogonal giving the method its name.

In practice, the signals are not generated by oscillators but since we are working with sampled signals anyhow, the symbol is generated by an N point IFFT (IFFT=Inverse Fast Fourier Transformation). So with the sampling period T0, the symbol duration is N*T0=Tsym. The N complex amplitudes per subcarrier serve as the spectral coefficients S(k). Since k serves as the frequency index this can also be denoted S(f) with f denoting the frequency.

In cellular systems with a frequency reuse factor of 1 the signal to interference ratio at the cell border approaches the factor 1 or 0 dB, so that no useful transmission from the base station to the mobile terminal can be kept up.

Therefore in CDMA transmission soft handover was introduced. Also both base stations use a differently scrambled pilot signal.

Single carrier frequency division multiplexing (FDM) also provides the frequency selective properties of OFDM.

In OFDM or single carrier FDM transmission, frequency groups are allocated to a mobile terminal instead of codes in CDMA transmission. Cross-cell interference can be coordinated allowing improvement of reception in the interference region. OFDM offers the possibility to flexibly allocate one or more subcarriers to one user or one logical channel, respectively, to control the data rate for this user channel.

Further it is assumed that channel estimation in the interference region of two cells is possible. This can e.g. be achieved by pilot symbols having higher energy than the data symbols which allows channel estimation even if the pilot symbol of the serving cell falls on the same subcarrier as the data symbol of the interfering cell. Additionally it is necessary that the pilot symbols of different cells do not fall on the same subcarrier, so the pilots are distributed on different frequency grids in different cells to allow channel estimation in the interference region. Alternatively the channel estimation in the interference region can be achieved by pilot symbols that use a spreading code and additionally a scrambling code that is cell specific and different for neighbor cells. Then the pilot symbol sequence is despreaded before used for channel estimation.

Adaptive subcarrier allocation or frequency scheduling is known to improve the transmission capacity of an OFDM or FDM transmission system. Due to different channel transfer functions and different interference for each mobile terminal, subcarriers or parts of the spectrum are better or worse suited for transmission dependent on the mobile terminal. This is indicated by the signal to interference ratio function of each mobile terminal. So the approach is to select, in the base station, the best subcarriers for each mobile terminal and allocate them to the respective mobile terminal in order to maximize the cell throughput. This shall also be done at the cell border where one or more dominant interferers exist and the interference cannot be assumed white anymore.

A method for an adaptive subcarrier allocation is described in "Multiuser OFDM with Adaptive Subcarrier, Bit, and Power Allocation" by Wong et al., IEEE Journal On Selected Areas In Communications, vol. 17, no. 10, October 1999. There, it is described that the base station estimates channel characteristics based on received uplink transmissions.

SUMMARY

The object of the invention is to perform an improved adaptive subcarrier allocation in a multi-cell scenario also when an interference coordination for the traffic or frequency patterns of the cells of the multi cell network is in place.

This object is achieved by a method according to the teaching of claim 1, a mobile terminal according to the teaching of claim 9, a base station according to the teaching of claim 10, and a multi cell network according to the teaching of claim 11.

In one embodiment, the invention relates to a method for performing adaptive subcarrier allocation to a mobile terminal for FDM (FDM=Frequency Division Multiplexing) or OFDM (OFDM=Orthogonal Frequency Division Multiplexing) transmission in a multi cell network wherein: i) transmit powers or spectral power distributions of base stations are estimated, ii) channel transfer functions are calculated based on measurements in the mobile terminal of pilots transmitted from base stations, iii) the transmit powers or the spectral power distributions are weighted with the channel transfer functions, iv) a signal power and an interference power received in the mobile terminal are estimated based on said weighted transmit powers or the spectral power distributions, v) a signal to interference ratio is estimated based on the estimated signal and interference power received in the mobile terminal, and vi) the adaptive subcarrier allocation is based on the signal to interference ratio of the subcarriers experienced by the mobile terminal.

In another embodiment, the invention relates to a mobile terminal for performing adaptive subcarrier allocation to a mobile terminal for OFDM or FDM transmission in a multi cell network, wherein: i) the mobile terminal comprises means for calculating channel transfer functions based on measurements in the mobile terminal of pilots transmitted from base stations, ii) the mobile terminal comprises means for weighting the estimated transmit powers or spectral power distributions of the base stations with the respective channel transfer function to estimate the signal and the interference power received in the mobile terminal, iii) the mobile terminal comprises means for estimating the signal to interference ratio based on the estimated signal and interference power received in the mobile terminal, and iv) the mobile terminal comprises means for sending the estimated signal to interference ratio to its serving base station.

In yet another embodiment, the invention relates to a base station for performing adaptive subcarrier allocation to a mobile terminal for OFDM or FDM transmission in a multi cell network, wherein the base station comprises means for performing adaptive subcarrier allocation based on the signal to interference ratio of the subcarriers experienced by mobile terminals.

In still another embodiment, the invention relates to a multi cell network comprising base stations for performing adaptive subcarrier allocation to a mobile terminal for OFDM or FDM transmission in a multi cell network, wherein the base station comprises means for performing adaptive subcarrier allocation based on the signal to interference ratio of the subcarriers experienced by mobile terminals and mobile terminals for performing adaptive subcarrier allocation to a mobile terminal for OFDM or FDM transmission in a multi cell network, wherein i) the mobile terminal comprises means for calculating channel transfer functions based on measurements in the mobile terminal of pilots transmitted from base stations, ii) the mobile terminal comprises means for weighting the estimated transmit powers or spectral power distributions of the base stations with the respective channel transfer function to estimate the signal and the interference power received in the mobile terminal, iii) the mobile terminal comprises means for estimating the signal to interference ratio based on the estimated signal and interference power received in the mobile terminal, and iv) the mobile terminal comprises means for sending the estimated signal to interference ratio to its serving base station for performing a method according to claim 1.

The main idea of the invention is that the adaptive subcarrier allocation is based on the signal to interference ratios for the subcarriers which are estimated in a mobile terminal with help of the pilots and afterwards reported back to the base station. Therefore, estimated spectral transmit power distributions of base stations are weighted with channel transfer functions which in turn are calculated based on measurements of pilots transmitted from the base stations in order to estimate the signal and the interference power received in a mobile terminal. The estimated signal and interference power are then used to estimate the signal to interference ratio usually resulting in a function over the frequency f.

DESCRIPTION OF THE DRAWINGS

In the following the invention will be explained further making reference to the attached drawings.

DETAILED DESCRIPTION

A multi cell network according to the invention comprises mobile terminals and base stations.

Each of said mobile terminals is connected to one or multiple of said base stations, and the base stations are in turn connected via base station controllers to a core network.

Figure 1:
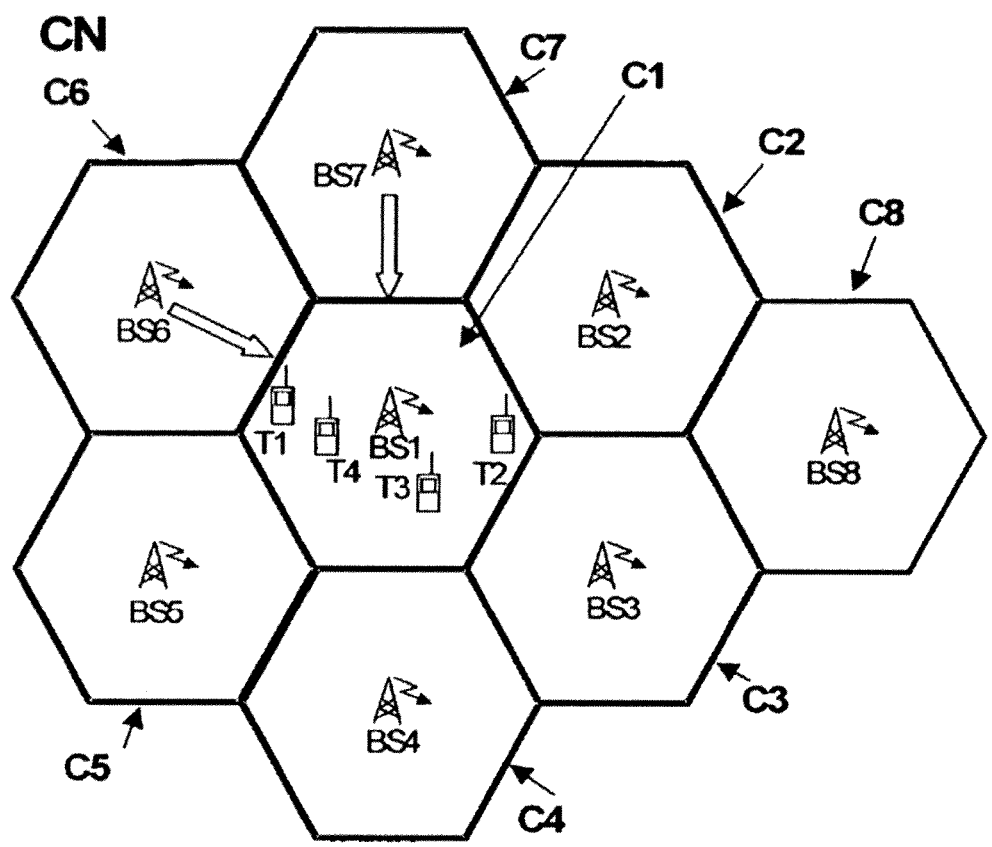
FIG. 1 schematically shows a multi cell network in which the invention can be implemented.

The multi cell network CN depicted in FIG. 1 is exemplarily divided in 8 cells C1-C8 and comprises exemplarily 8 base stations BS1-BS8 and 4 mobile terminals T1-T4.

Each of the 8 base stations BS1-BS8 serves their respectively assigned cell C1-C8 and provides for data exchange of mobile terminals T1-T4 that are located within their respectively assigned cell C1-C8.

For the sake of simplicity, the connections of the base stations BS1-BS8 to further elements of the multi cell network, as e.g. controllers, are not depicted in FIG. 1.

The radio connections between the mobile terminals T1-T4 and their serving base station BS1 are disturbed by interferences from neighboring base stations BS2-BS8, which is indicated exemplarily by two broad arrows in the cells BS6 and BS7.

The mobile terminals T1-T4 comprise the functionality of a mobile terminal for transmission and reception in a mobile network as e.g. an OFDM network, i.e. they can be connected to a multi cell network by means of a base station.

Furthermore, a mobile terminal according to the invention comprises means for calculating channel transfer functions based on measurements in the mobile terminal of pilots transmitted from base stations, the mobile terminal comprises means for weighting the estimated transmit powers or power spectra of the base stations with the respective channel transfer function to estimate the signal and the interference power (spectra) received in the mobile terminal, the mobile terminal comprises means for estimating the signal to interference ratio based on the estimated signal and interference power or power spectra received in the mobile terminal, and the mobile terminal comprises means for sending the estimated signal to interference ratio or SIR(f)-function to its serving base station.

The base stations BS1-BS8 comprise the functionality of a base station of a mobile network as e.g. a WLAN or an OFDM network, i.e. they provide the possibility for mobile terminals T1-T4 to get connected to the multi cell network CN.

Furthermore, a base station BS1-BS8 according to the invention comprises means for performing adaptive subcarrier allocation based on the signal to interference ratio of the subcarriers experienced by mobile terminals T1-T4.

It is observed that the interference from a neighbor base station depends on two factors. First the frequency patterns and thus all transmitted subcarriers are scheduled with a certain power allocation which leads to the transmitted power spectrum $|I(f)|^2$ with f denoting the frequency. Second this power allocation is shaped by the channel transfer function Hi(f) for the interfering channel, resulting in $|I(f)|^2 * |Hi(f)|^2$ as the value for the interference power received in a mobile terminal. This is approximately true also for asynchronous reception.

However, the power scheduling from a neighbor base station is generally not known to a base station and to the mobile terminals served by said base station.

The invention is now, since the power scheduling is not known in advance, to assume an upper worst case or mean value for the transmit power $|I(f)|^2$, to use the pilots of the interfering base stations to calculate the interference channel transfer functions and to calculate the signal to interference ratio function SIR(f) using these assumptions or approximations e.g. as given in the following. It is thereby used that at the cell border when an interferer is dominant this should also show in the pilots. As well the pilots of the base station of the serving cell are used to calculate the desired signal channel transfer function $|Hd(f)|^2$.

If one assumes that the desired signal spectrum Sd(f) is normalized to a mean value Sd0 the signal to interference ratio function is:

$$SIR(f) = \frac{|Sd0|^2 \times |Hd(f)|^2}{\left(\sum_{v=1}^{M} \sum |I_v(f)|^2 \times |Hi_v(f)|^2\right) + Iges + N}$$

In the numerator of the sum, as already mentioned Hd(f) denotes the desired signal channel transfer function and $|Sd0|^2 \cdot *|Hd(f)|^2$ denotes the value for the signal power received in a mobile terminal assuming a constant desired signal spectrum. Inside the sum in the denominator the dominant interferers denoted by the index v are gathered.

Iges denotes the interference power received in a mobile terminal from all non-dominant interferers from farther distant cells. It can e.g. be estimated by the difference of the measured noise, when estimating the time discrete channel transfer function from pilot measurement evaluation, i.e. the interference part measured in a mobile terminal, and the predicted interference from the dominant interferers, e.g. $|I1(f)|^2 \cdot *|Hi1(f)|^2$ and $|I2(f)|^2 \cdot *|Hi2(f)|^2$.

N as given in the denominator denotes the thermal noise estimate.

In a preferred embodiment of the invention, for the dominant interferers the known restrictions from interference coordination shall be used as e.g.

$$I1(f) = \begin{pmatrix} I1 & \text{else} \\ PI & \text{in a restricted frequency set} \end{pmatrix}$$

$$I2(f) = \begin{pmatrix} I2 & \text{else} \\ PI & \text{in a restricted frequency set} \end{pmatrix}$$

with PI being e.g. −10 dB in this example with two dominant interferers.

I1, I2 are the assumed worst case or mean values for the interference and PI is the interference in a restricted frequency set which is restricted due to interference coordination.

Especially at the cell border where the interference cannot be assumed to be white, the incorporation of the interfering channel transfer function is important. Here the pilots from the neighbor cells can easily be used to calculate the interfering channel transfer functions.

In an embodiment of the invention, the interference $I1(f)$ and $I2(f)$ can be modeled to also contain the pilot amplitudes from the interfering cells which are known of course.

The signal to interference ratio function SIR(f) estimation can be improved for the received frequency pattern also by using decoded received data that were transmitted to the mobile terminal. However, this is seen limited to the received frequency pattern.

Figure 2:
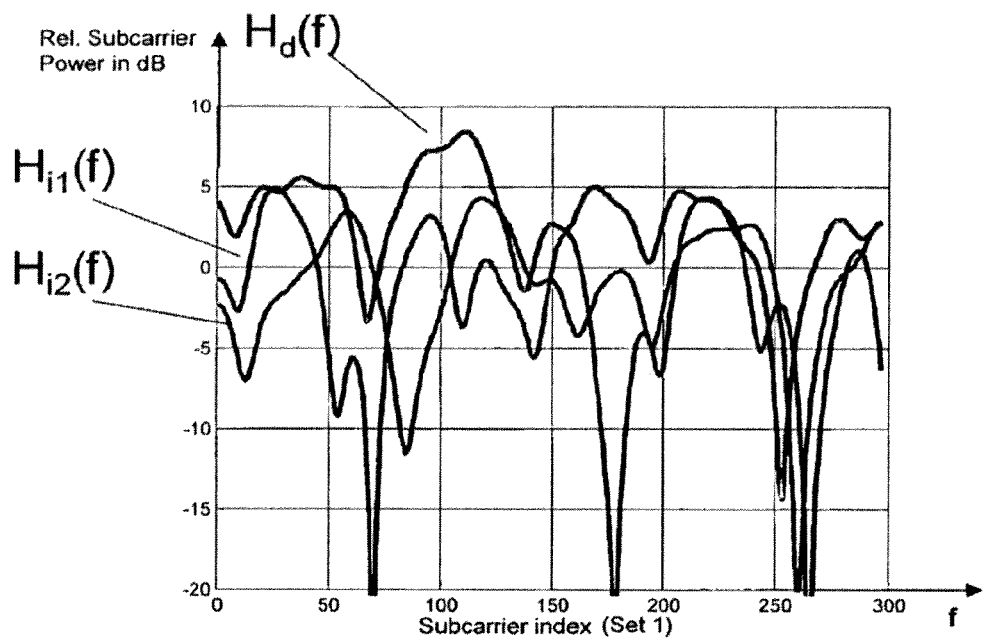
FIG. 2 schematically shows the desired signal channel transfer function Hd(f) and interfering channel transfer functions Hi1(f) and Hi2(f) from two dominant interfering base stations.

In FIG. 2, examples for the desired signal channel transfer function Hd(f) and two interfering channel transfer functions $Hi1(f)$ and $Hi2(f)$ are shown to make clear their influence. Here the relative subcarrier power is plotted against the subcarrier index, i.e. against the frequency f.

In the case of multiple transmit and possibly multiple receive antennas the principle can similarly also be applied. The interference in the denominator of the signal to interference ratio function $|I_v(f)|^2 \cdot *|Hi_v(f)|^2$ can then describe the interference from one transmit antenna or the aggregation from multiple correlated transmit antennas of a neighbor base station and summation has to be done over multiple independent transmit antennas and multiple dominant neighbor base stations.

Depending on the multi-antenna technique for the desired signal (transmit diversity, beamforming, Multiple Input Multiple Output (MIMO)) and a possible channel matrix inversion calculation (decoupling), if multiple receive antennas are in place, the numerator consists then still only of one (if matrix inversion is possible) or of multiple desired channel transfer functions. In case of multiple transfer functions it is e.g. given as $|Sd0|^2 \cdot *|w_A Hd_A(f) + w_B Hd_B(f)|^2$ where $w_A$ and $w_B$ are e.g. the complex antenna weights of serving base station antenna A and serving base station antenna B respectively. In case of a possible decoupling by using the signals from multiple receive antennas, multiple SIR(f)-functions can be reported. The principle can then accordingly be applied as described.

In interference coordination schemes the mobile terminal measures which are the strongest interferers by means of path loss measurements. These are usually the base stations of the cells where the mobile terminal is next to. For these interferers the known distributed restrictions are used in estimation of the power spectra such as $|I1(f)|^2$ and $|I2(f)|^2$. As is the goal of interference coordination schemes in the part of the spectrum where the interference power is restricted the SIR(f) is high and the subcarriers are well suited for usage.

Since this situation does not depend on the desired channel transfer function Hd(f) and does not change on a short term (scheduling frame) basis but only changes when the mobile terminal moves to another neighbor cell, in this frequency region the information about high SIR(f) can be considered more reliable since it will stay valid over a longer time even if the mobile terminal has a certain speed.

Thus in another embodiment, in the frequency region where there are restrictions in traffic patterns due to interference coordination schemes, the signal to interference ratio function can be marked as more reliable e.g. in the base station to further improve the performance of a scheduling algorithm using the method according to the invention. Thus this marked reliability is used for the scheduling decision. This can be done e.g. by giving mobile terminals of relatively higher speed or mobile terminals with rapidly changing channel transfer functions preferably these frequency regions of the spectrum.

The method according to the invention can also be similarly applied if the power scheduling is a priori fixed or if more information on the power scheduling of neighbor base stations is available.

I claim:

1. A method for facilitating adaptive subcarrier allocation to a mobile terminal for Orthogonal Frequency Division Multiplexing (OFDM) or Frequency Division Multiplexing (FDM) transmission in a multi cell network, comprising:
estimating transmit powers or spectral power distributions of a serving base station and at least one neighboring base station at the mobile terminal, wherein the estimating takes into account restrictions of the transmit powers or the spectral power distributions due to interference coordination schemes for the multi cell network;
calculating channel transfer functions based on measurements in the mobile terminal of pilots transmitted from the serving base station to the mobile terminal and from the at least one neighboring base station to the mobile terminal;

weighting the estimated transmit powers or the estimated spectral power distributions with the channel transfer functions at the mobile terminal;

estimating a signal power associated with the serving base station and an interference power associated with the at least one neighboring base station at the mobile terminal based on the weighted transmit powers or the weighted spectral power distributions; and estimating a signal to interference ratio at the mobile terminal based on the estimated signal power and the estimated interference power.

2. The method according to claim 1, further comprising: transmitting the estimated signal to interference ratio from the mobile terminal to the serving base station.

3. The method according to claim 1, wherein identification of restrictions of the transmit powers or the spectral distributions due to interference coordination schemes is supported by path loss measurements, whereby the restrictions depend on cell identifications.

4. The method according to claim 1, wherein interference that stems from farther distant interfering base stations is assumed to be white and contributes with a frequency-independent fraction to the estimated signal to interference ratio.

5. The method according to claim 1, wherein the estimation of the transmit power or the spectral power distribution of an interfering base station takes into account the power of the pilots sent by said interfering base station.

6. The method according to claim 1, wherein the estimation of the signal to interference ratio takes into account a thermal noise estimate.

7. A method for performing adaptive subcarrier allocation to a mobile terminal for Orthogonal Frequency Division Multiplexing (OFDM) or Frequency Division Multiplexing (FDM) transmission in a multi cell network, comprising:

receiving an estimated signal to interference ratio from the mobile terminal at a serving base station, the estimated signal to interference ratio based on signal power and interference power estimated by the mobile terminal, and allocating an adaptive subcarrier to the mobile terminal based on the estimated signal to interference ratio for subcarriers experienced by the mobile terminal;

wherein the estimated signal power is associated with the serving base station and the estimated interference power is associated with at least one neighboring base station;

wherein the estimated signal power and the estimated interference power are based on transmit powers or spectral power distributions estimated and weighted by the mobile terminal;

wherein the transmit powers or spectral power distributions are weighted by the mobile terminal based on channel transfer functions calculated by the mobile terminal;

wherein the channel transfer functions are calculated by the mobile terminal based on measurements of pilots received by the mobile terminal from the serving base station and the at least one neighboring base station;

wherein the transmit powers or spectral power distributions for the serving base station and the at least one neighboring base station are estimated by the mobile terminal taking into account restrictions of the transmit powers or the spectral power distributions due to interference coordination schemes for the multi cell network.

8. The method according to claim 7, wherein the adaptive subcarrier allocation takes into account that restrictions of the transmit powers or spectral power distributions of the base stations due to interference coordination schemes lead to more reliable signal to interference ratios in frequency regions with restrictions of the transmit powers or spectral power distributions of the base stations.

9. A mobile terminal for facilitating adaptive subcarrier allocation for Orthogonal Frequency Division Multiplexing (OFDM) or Frequency Division Multiplexing (FDM) transmission in a multi cell network, comprising:

a first estimating processor configured to estimate transmit powers or spectral power distributions of a serving base station and at least one neighboring base station, wherein the estimating takes into account restrictions of the transmit powers or the spectral power distributions due to interference coordination schemes for the multi cell network;

a calculating processor configured to calculate channel transfer functions based on measurements of pilots transmitted from the serving base station to the mobile terminal and from the at least one neighboring base station to the mobile terminal;

a weighting processor configured to weight the estimated transmit powers or the estimated spectral power distributions with the channel transfer functions;

a second estimating processor configured to estimate a signal power associated with the serving base station and an interference power associated with the at least one neighboring base station based on the weighted transmit powers or the weighted spectral power distributions; and a third estimating processor configured to estimate a signal to interference ratio based on the estimated signal power and the estimated interference power.

10. The mobile terminal according to claim 9, further comprising:

a transmitter configured to transmit the estimated signal to interference ratio from the mobile terminal to the serving base station.

11. The mobile terminal according to claim 9 wherein interference that stems from farther distant interfering base stations is assumed to be white and contributes with a frequency-independent fraction to the estimated signal to interference ratio.

12. The mobile terminal according to claim 9 wherein identification of restrictions of the transmit powers or the spectral distributions due to interference coordination schemes is supported by path loss measurements, whereby the restrictions depend on cell identifications.

13. The mobile terminal according to claim 9 wherein the estimation of the transmit power or the spectral power distribution of an interfering base station takes into account the power of the pilots sent by said interfering base station.

* * * * *